(12) United States Patent
Aubert et al.

(10) Patent No.: US 7,780,819 B2
(45) Date of Patent: Aug. 24, 2010

(54) CHEMICAL ELEMENTS EXTRACTION PROCESS BY NON-THERMAL PLASMA AND DEVICE FOR IMPLEMENTATION

(75) Inventors: Bruno Aubert, Connaux (FR); Jean-baptiste Castang, Newnan, GA (US)

(73) Assignee: EM Research Labs LLC, Newnan, GA (US)

( * ) Notice: Subject to any disclaimer, the term of this patent is extended or adjusted under 35 U.S.C. 154(b) by 758 days.

(21) Appl. No.: 11/162,282

(22) Filed: Sep. 5, 2005

(65) Prior Publication Data

US 2007/0051614 A1    Mar. 8, 2007

(51) Int. Cl.
*C01B 53/00*    (2006.01)
*C25B 5/00*    (2006.01)

(52) U.S. Cl. .................................. 204/157.43; 204/155
(58) Field of Classification Search ............ 204/157.43, 204/155
See application file for complete search history.

*Primary Examiner*—Jafar Parsa

(57) ABSTRACT

The present invention has for its objects a process for extracting the chemical elements contained in diverse products (i.e. waste, ashes, used catalysts, etc. . . .) or in raw materials such as soils, sediments, lands, brownfields and ores and a device to implement the process. The process consists in forming volatile compounds with one or several elements to be extracted present in a first reactor using a gas being maintained outside of thermodynamic equilibrium as in non-thermal plasma (electric discharge under high or low pressure, corona discharge . . . ). These volatile compounds are then exhausted towards secondary reactors intended to selectively extract said volatile compounds by decomposition or by condensation to recover each elements and the gas which can be recycled.

5 Claims, 2 Drawing Sheets

CHEMICAL ELEMENTS EXTRACTION PROCESS BY NON-THERMAL PLASMA AND DEVICE FOR IMPLEMENTATION

The present invention has for its objects a novel extraction process of the chemical elements contained in various materials such as waste, ashes, used catalysts or in raw materials such as soils, lands, sediments, brownfields and ores.

The aforementioned process pertains, as its description will demonstrate, to the remediation and cleanup of heavy metals-contaminated soils, to mining extraction and to the recovery of chemical elements such as Cadmium, Nickel, Titanium and other high value metals present in the residues (fly ashes) of waste incinerators or in used catalysts. Until now, when the desire was to extract a specific element among others in a product, waste or ores, it was necessary to resort to a chemical or to a thermal treatment process. In various types of chemical treatment processes such as dissolution followed by an extraction liquid/liquid, crystallization by ions exchange or membrane filtration, secondary effluents are generated in important quantity and the infrastructures needed are expensive in terms of capital investment and operating costs.

As far as thermal treatments processes (i.e. evaporation, sublimation or distillation) the simple process of high temperature heating of metal oxides mixtures leads mostly to the corrosion of the oven or the melting pot and can result in some cases in their complete destruction.

The operating costs of such thermal processes are quickly prohibitive as several KWH/KG are needed on average to melt a mixture of metal oxides at 1100° C.

Other experimental treatment processes have been developed such as biological processes, in which bacteria specifically targeting the metal to be extracted are selected, the overall effectiveness of the process depending mainly on the PH and the temperature of the experiment.

Therefore, these biological processes are not efficient ways to extract several elements in complex mixtures of variable compositions.

More recently, novel extraction processes using cold plasmas, notably under microwaves, have been developed but only to remove part of a product constituted by a single element. As an example, In the case of microelectronics etching, using a fluoride gas, the silicon on a wafer is removed where it is not masked and forms a volatile compound with the gas. However this technique requires finding a specific gas for the targeted element, can not be applied to all the elements and must be performed under strong vacuum conditions.

The object of the present invention pertains to a process allowing the extraction of a large quantity of various elements, mixed or not, with an identical, non toxic, non corrosive and inexpensive gas.

In addition this novel process produces compounds presently unknown allowing multiple applications.

This new process consists of forming volatile compounds with one or several elements to be extracted present in a first reactor using a gas being maintained outside of thermodynamic equilibrium.

These volatile compounds are then extracted and exhausted towards a second reactor intended to decompose or to condense said volatiles compound to recover on one hand the extracted element and on the other hand the gas which can be recycled.

We advantageously use carbon dioxide as reagent gas excited in a high frequency electric discharge (in a range between 1 MHz and 300 MHz) or microwave discharge (in a range between 300 MHz and 30 GHz).

The carbon dioxide decomposes at ambient temperature in the radical of carbon monoxide (CO°).

These radicals are going to react with the elements to be extracted, according to the level of energy injected in the gas and to the temperature and the pressure of the reactor. At first, oxides are reduced in metal utilizing the pronounced reducing property of the excited carbon monoxide. Quickly, the metal produced is reacting with several other carbon monoxide radicals to form a metal carbonyl.

Depending on the reactor temperature, the formed carbonyl can be at a vapour state and thus be exhausted towards the second reactor in which specific conditions of temperature and pressure are maintained to decompose the carbonyl into the metal which condenses and the gas which is recycled or to directly condense the carbonyl for further processing. The main advantage for using the carbonyl chemistry is that there is a wide variety of composition with most of the metals. Another advantage is that carbonyls have low boiling points, close to ambient temperature, allowing treatment of materials at relatively low temperatures thus reducing energy consumption.

However, the classical forming of carbonyls metals such as gold carbonyl requires operating at very high temperatures and pressures (approximately 200° C. and 200 bars). It is where the use of a discharge, commonly called non-thermal plasma, finds all its justification.

Indeed, it is possible with the use of extremely reactive free radicals formed in the plasma, to synthesize carbonyls at ambient temperature and low pressure (under vacuum or at atmospheric pressure).

As an example, a non exhaustive list of carbonyls follows: $Se(CO)$, $Cr(CO)_6$, $Ir_4(CO)_{12}$, $Ir_2(CO)_8$, $Fe_2(CO)_9$, $Fe(CO)_5$, $Fe(CO)_4$, $Mo(CO)_6$, $Ni(CO)_4$, $[Re(CO)_5]_2$, $Ru(CO)_6$, $W(CO)_6$, $Co_2(CO)_8$, $Co_4(CO)_{12}$, $Rh_2(CO)_8$, $Rh_4(CO)_{12}$, $Os(CO)_5$, $Os_3(CO)_{12}$, $Mn_2(CO)_{10}$, $V(CO)_6$, $Tc_2(CO)_{10}$.

Most of these carbonyls have boiling points lower than 150° C. approximately at atmospheric pressure. In addition, these boiling points are specific and distinct from one another permitting in the process a selective separation of the elements by adjusting the temperature and the pressure of the reactor to the very elements to be separated.

However, in the case of two metals giving carbonyls with almost similar properties like for example Osmium and Iron, or for elements presenting a weak capacity to be transformed into carbonyls, we are able to add a halogen such as chlorine to the carbon dioxide gas.

Indeed, thanks to the chlorine compound (Cl2, HCl), it is possible to form chloro-carbonyls with more differentiated properties as for example Os(CO) 3Cl2.

DESCRIPTION OF THE PREFERRED EMBODIMENT

We present below an example of Chromium contaminated soil treatment (case N°1) as well as an example of the recovery of elements (Zn, Hg) from column 2B of the Mendeleyev table in the residues of incinerated household waste (case N°2).

Figure 1:
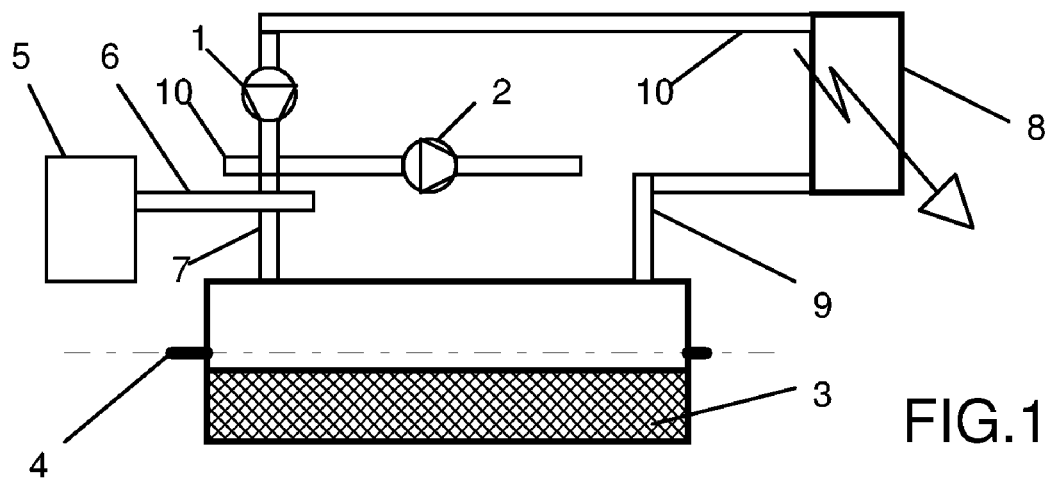
FIG. 1 is a longitudinal cross-sectionnal view of an apparatus for metal recovery working under low pressure in accordance with one embodiment of the invention.

Case N°1: the FIG. 1 in the appendix represents a drawing of the process.

The contaminated soil (3) is introduced in a horizontally placed cylindrical reactor (4) thermally stabilized, under low pressure (approximately 1 Torr) maintained by a vacuum pump (2).

As soon as the required pressure is reached, the pump (2) is stopped and the corresponding circuit closed. The pump (1) is then started to promote gas recirculation. The reactor (1) is then put in motion (alternative rotation for example) to stir the soil, mixing it with the reagent gas.

Carbon dioxide is then injected via the intake (10) in a tube made of quartz (7) crossing the wave guide TE01 (6) inside of which a strong electromagnetic field is maintained. This guide is connected to a microwaves generator at 2.45 GHz (5).

The excited gas is quickly injected by the recirculation pump (1) into from the soil that as been maintained at a temperature of 50° C. in the first reactor (4).

Chromium carbonyl quickly appears from the forming reaction generated by the contact the exited gas and the contaminated soil.

At that stage, vapours that have formed are exhausted through the pipe (9) at the other and of the reactor (4) toward a second reactor (8) that is being maintained at low temperature (approximately 0° C.) to permit carbonyl recovery.

The whole treatment lasts approximately 30 minutes and consumes only a small amount energy.

One metric ton of soil can be treated with only a few KG of CO2 and a few KWH (Approximately 2 KWH for the microwaves plasma and a dozen KWH for the engines, the pumps and the cooling system). For the same example, a purely thermal process like distillation requires about 500 KWH.

Figure 2:
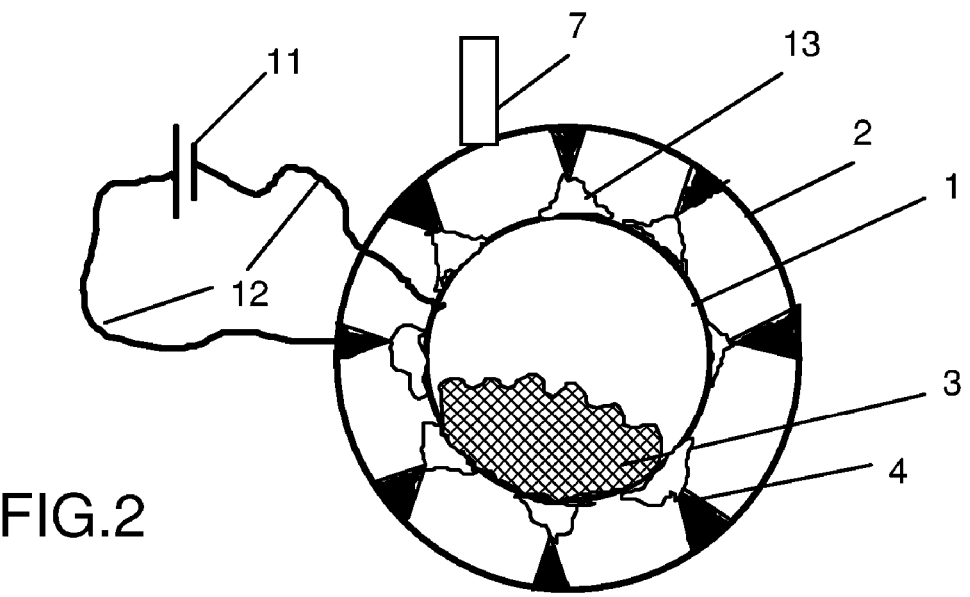
FIG. 2 is a transverse cross-sectionnal view of an apparatus for metal recovery working under atmospheric pressure in accordance with another embodiment of the invention.
Figure 3:
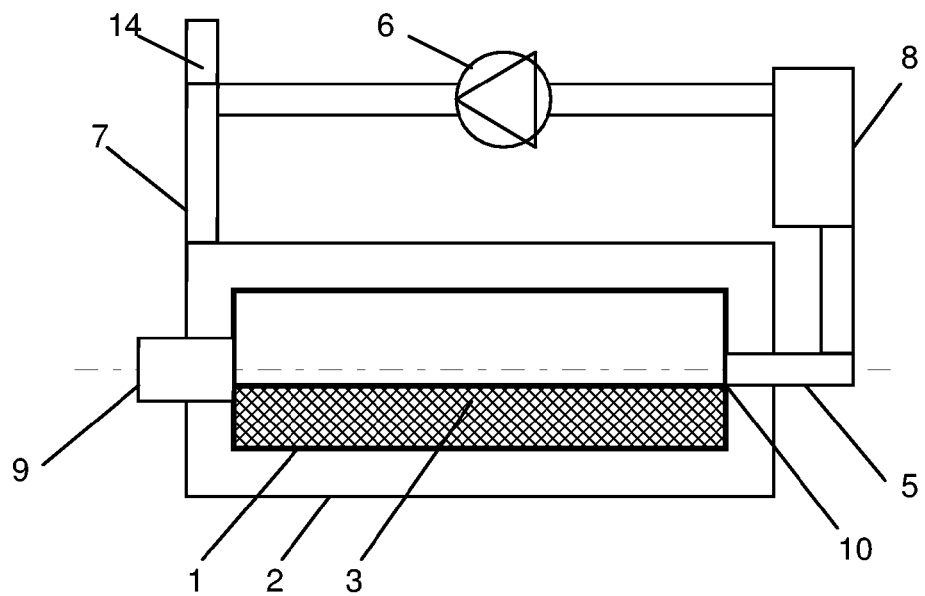
FIG. 3 is a longitudinal cross-sectionnal of the apparatus described in FIG. 2.

Case N°2: FIG. 3 shows a schema of the process and FIG. 2 shows a cross-section of the main reactor operating in this example near atmospheric pressure.

Flying ashes are introduced into the cylindrical, horizontal and sintered steel reactor (1) (thus porous) covered with a dielectric material (silica & alumina) itself porous. The reactor (1), which can be penetrated by a gas, is surrounded by an airtight metallic vessel (2).

This airtight surrounding vessel (2) is cover with a multitude of metallic pins (4). The reactor (1) and the surrounding vessel (2) are electrically isolated from each other and are connected with a generator of alternative voltage (25 000V and 7000 Hz). Corona discharges (13) are generated between the surrounding vessel (2) pins and the reactor (1).

The carbon dioxide is injected in the surrounding vessel (2) via the intake (14). The recirculation pump (6) creates a continuous flow through the porous reactor (1). Carbon dioxide passes through the zone where the discharges are generated, becomes excited and immediately reacts with the flying ashes present in (1), to form Zinc carbonyl. The recirculation pump (6) also permits the newly formed gases to exhaust toward the second reactor which is maintained at a temperature of 100° C. approximately to decompose the Zinc carbonyl and recycle the CO2.

The process makes possible the recovery of materials with high added value in simple flying ashes that would otherwise have been disposed in a landfill most likely.

The process interesting results are not only the surprisingly rich variety of elements that can be separated but also its simplicity as the gas being used (CO2) is inexpensive in the quantity required and is non toxic and the process conditions are not constraining.

What is claimed is:

1. A process for extracting chemical elements selected from the group consisting of contaminated soils by heavy metals, cadmium, nickel, titanium, mining extraction and metals present in fly ashes comprising: forming volatile compounds having a carbonyl and metastable structure between said chemical elements and carbon monoxide and halogen or carbon dioxide and halogen, separating the volatile compounds, wherein the formation of volatile compounds is achieved by the excitement of said carbon monoxide or carbon dioxide in an electrical discharge using a non-thermal plasma, to form volatile reactive halogen-carbonyls.

2. The process according to claim 1, wherein the separation of volatile compounds is obtained by selective condensation or decomposition at temperatures and pressures of liquefaction, solidification or specific decomposition specific to each volatile compounds.

3. The process according to claim 1, wherein the excitement of the gas is achieved using a corona discharge.

4. The process according to claim 1, wherein the excitement of the gas is achieved in a high frequency discharge in a range of 1 MHz to 300 MHz.

5. The process according to claim 1, wherein the excitement of the gas is achieved in a microwave discharge in a range between 300 MHz to 30 GHz.

* * * * *